United States Patent [19]

Chen et al.

[11] Patent Number: 5,133,527
[45] Date of Patent: Jul. 28, 1992

[54] ACTIVE MOUNTS

[75] Inventors: Hsiang M. Chen, Latham; Paul Lewis, Scotia; Donald S. Wilson, Clifton Park; Richard A. Dorman, Wynantskill, all of N.Y.

[73] Assignee: Mechanical Technology Incorporated, Latham, N.Y.

[21] Appl. No.: 692,564

[22] Filed: Apr. 29, 1991

Related U.S. Application Data

[63] Continuation-in-part of Ser. No. 392,197, Aug. 10, 1989, Pat. No. 5,011,108.

[51] Int. Cl.⁵ .................................... F16M 13/00
[52] U.S. Cl. ................................ 248/550; 248/636; 248/638
[58] Field of Search ................. 248/638, 636, 550; 188/1.11, 378, 379, 380; 267/136; 52/167

[56] References Cited

U.S. PATENT DOCUMENTS

| | | | |
|---|---|---|---|
| 3,088,062 | 4/1963 | Hudimac | 248/550 X |
| 3,464,657 | 9/1969 | Bullard | 248/550 |
| 4,033,541 | 7/1977 | Malueg | 248/550 |
| 4,352,481 | 10/1982 | Forward | 248/550 |
| 4,615,504 | 10/1986 | Sandercock | 248/638 X |
| 4,624,435 | 11/1986 | Freudenberg | 248/550 |
| 4,635,892 | 1/1987 | Baker | 52/167 X |
| 4,795,123 | 1/1989 | Forward | 188/378 X |
| 4,796,873 | 1/1989 | Schubert | 267/136 |
| 4,821,205 | 4/1989 | Schutten | 248/550 X |
| 4,869,474 | 9/1989 | Best | 267/136 |

Primary Examiner—J. Franklin Foss
Attorney, Agent, or Firm—Kane, Dalsimer, Sullivan, Kurucz, Levy, Eisele and Richard

[57] ABSTRACT

The present invention relates to an active mount system in which a vibration sensor such as a force gauge or an accelerometer senses vibrational forces transmitted through a resilient mount by a load such as a machine. The invention further includes a digital narrow-band least mean square filter that receives a sinusoid synchronous with the rotating machinery and an error signal from the load cell and generates a corrective signal to be amplified and transmitted to the electromagnet which supplies an attenuating force to the resilient mount in response to the signal. As an alternative, a wide frequency range control can be realized by the use of a wide frequency range, high gain amplifier and multi-filter phase compensation circuitry to generate the corrective force signal which is amplified and transmitted to the electromagnet.

12 Claims, 4 Drawing Sheets

ACTIVE MOUNTS

This application is a continuation-in-part of allowed U.S. application Ser. No. 07/392,197, filed Aug. 10, 1989, now U.S. Pat. No. 5,011,108.

BACKGROUND OF THE INVENTION

The present invention relates to active mounts which are introduced between a machine and foundation or other supporting structure. In particular, the present invention relates to active mounts for sensing and attenuating vibrational forces transmitted by dynamic loads from a machine, such as a motor, through a resilient mount such as by elastomers or springs, further either using a least mean square analysis which employs a reference sinusoid synchronous with the rotation of the motor and signal from a load cell or using a high gain broadband control circuit that amplifies the load cell signal over a wide frequency range which includes the motor running speed and running speed harmonic frequency component ranges, thereby generating a control signal to an electromagnet.

Various types of equipment utilizing soft mounts are known which perform two functions:

1. Isolate the forces generated by the equipment from the foundation and surroundings; and
2. Isolate external forces and disturbances from the equipment.

This is most usually accomplished by the use of soft mounts. The low mount stiffness ensures that the equipment/base/mount combination has a low natural frequency. Disturbances at frequencies above the natural frequency are attenuated to accomplish both of the above functions.

Usually, rubber is the most generally used material. Cross-sectional areas are dictated by rubber bearing stress limits. Area and the modulus of rubber result in a practical allowable size which limits how low the mount stiffness can be. In short, while dynamic force transmission levels can be reduced, some force will still be transmitted. Further force reduction is not possible with a purely passive system.

Accordingly, it would be advantageous to develop a mount which avoids the drawbacks associated with the aforementioned prior art proposals.

SUMMARY OF THE INVENTION

The present invention provides for an active mount system which generates forces which act to greatly reduce the transmitted forces. The active mount system includes a resilient mount preferably formed of a structure of a rubber or similar material for supporting the load in compression; a force transducer arranged in parallel with the resilient mount, and associated signal control circuitry. The force transducing means for the active mount system can be an electromagnet, however, other means such as piezo-electric devices, magnetorestrictive devices, etc. could be utilized. The signal control circuitry includes either a least mean square analysis which employs a reference sinusoid synchronous with the rotation of the motor and signal from a load cell or a high gain, broad frequency band control amplifier circuit to amplify the load cell signal, thereby generating a control signal to an electromagnet. The signal control circuitry using either control approach acts to alter the stiffness and damping characteristics of the mount system to achieve additional force attenuation gains. The present invention reduces dynamic forces over either a narrow frequency range or a wide frequency bandwidth determined by whether the least mean square analysis control or high gain broadband control is utilized. The effect of the control is in essence the reduction of stiffness of the active mount over the frequency range of the control and the cross talk among a plurality of mounts can be ignored in the control. The three primary functions of both types of control circuitry are to provide the gain required to achieve the specified force reduction, phase compensation to ensure stability over the force reduction frequency range, and interface with the control (or power) amplifier. The least mean square control is preferably realized by a digital processor unit and the high gain broadband control can be composed of either a processor unit or an analog circuit with one high gain stage to amplify the load cell signal and filter stages to perform phase compensation.

DESCRIPTION OF THE DRAWINGS

For a fuller understanding of the nature and objects of the invention, reference should be made to the following detailed description, taken in connection with the accompanying in which.

DETAILED DESCRIPTION OF THE PREFERRED EMBODIMENT

Figure 1:
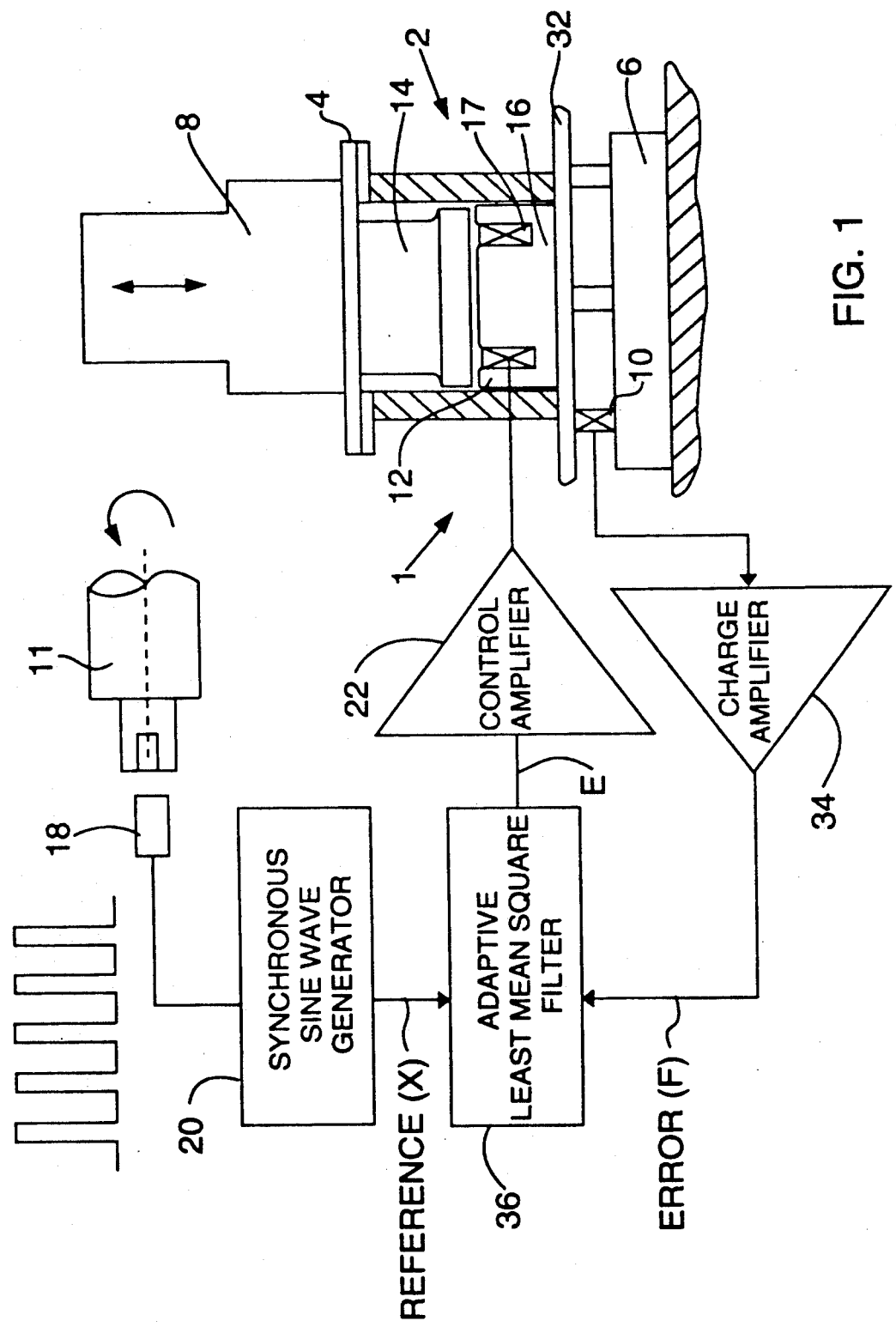
FIG. 1 schematic drawing of an active mount system for narrow frequency range or a reduction of transmitted forces in accordance with the teachings of the present invention.

Referring now to the drawings in detail wherein like numerals indicate like elements throughout the several views, FIG. 1 in which is shown an active mount system 1 comprising a resilient mount 2, preferably formed of rubber or similar material. Resilient mount 2 is disposed between a machine mounting plate 4 and the foundation or other supporting structure 6 for the system and a machine 8 secured to the mounting plate 4. Machine 8 includes rotating shaft 11, which is shown enlarged adjacent to machine 8. The rotation of shaft 11 of machine 8 is the primary source of vibration in this system. The system also includes a vibration sensor device 10 such as a load cell, a force gauge, a velocity probe, or an accelerometer, and an electromagnet 12 including a laminated armature 14 and a laminated stator 16 carrying winding 17. Electromagnet 12 provides the force transducer means for the active mount system 1. The system further includes speed sensor 18 which generates one pulse per rotation of shaft 11. The output of speed sensor 18 is received by synchronous sine wave generator 20. Synchronous sine wave generator 20 generates a sinusoid with one cycle per pulse received from speed sensor 18 (and possibly harmonics thereof). The output of synchronous sine wave generator 20 is used as a reference (X) to digital, narrow band, adaptive least means square filter 36.

The active mount system shown in FIG. 1 includes force gauge 10 which is mounted on one end of a table 32 between the mount and the support structure 6. The output of force gauge 10, which represents the transmitted vibrational forces, is applied to the input of a charge amplifier 34. The output of charge amplifier 34 is representative of the error (F) of the system as a force transmitted to ground.

Figure 4:
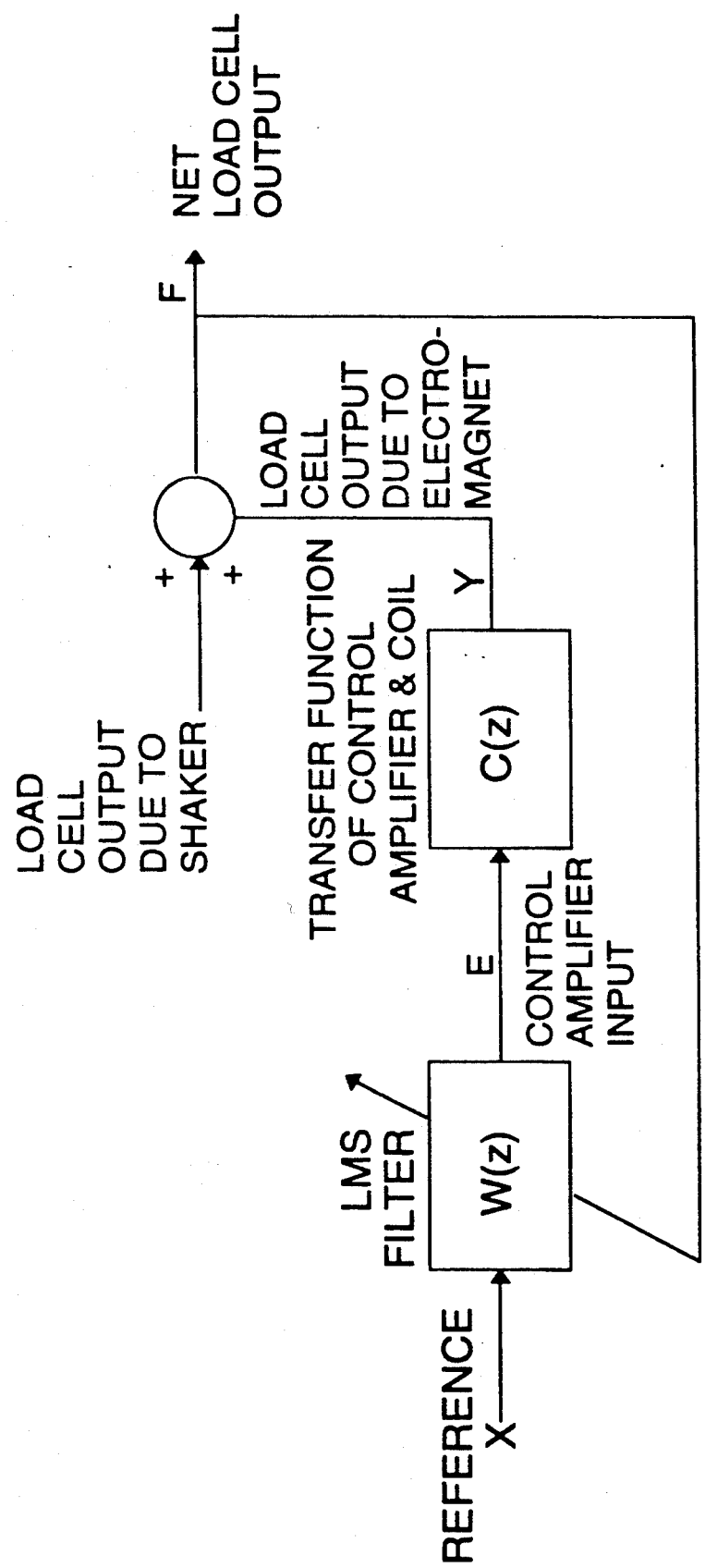
FIG. 4 is an adaptive control block diagram of the apparatus of FIG. 1.

Adaptive least mean square filter 36 receives a reference input (X) from synchronous sine wave generator and an error signal (F) from charge amplifier 34. Digital, narrow band adaptive least mean square filter 36 receives the "error" (F) of the algorithm from charge amplifier 34 and the reference (X) of the system from synchronous sine wave generator 20 and generates a control signal E using an adaptive least mean square algorithm. This algorithm is shown in FIG. 4. The dynamic force transmitted through the mount due to the shaking action of the top plate is designated as D. The electromagnet provides a canceling force Y. The sum of these two forces is the error force F as sensed by the load cell.

The reference signal X causes the unwanted force D. The control signal to the power amplifier driving the electromagnet is represented by E. The transfer function from the power amplifier input to the charge amplifier output is shown as C(Z). For a narrow frequency band operation, C(Z) may be approximated by a two-point filter equation, as follows:

$$C(Z) C_0 + C_1 Z^{-1}$$

The least mean square filter may also be represented by two points:
$$W(Z) = W_0 + W_1 Z^{-1}$$

Applying a least mean square algorithm, the filter coefficients are updated as follows:

$$W_0(n+1) = W_0(N) - \alpha F(n)[C_0 X(n) + C_1 X(n-1)]$$

$$W_1(n+1) = W_1(n) - \alpha F(n)[C_0 X(n-1) + C_1 X(n-2)]$$

Wherein n denotes the $n^{th}$ sample and $\alpha$ is the convergence coefficient. The convergence coefficient (e) and transfer function coefficients $C_0$ and $C_1$ are determined experimentally. The experiments include injecting a sinusoidal signal into the control amplifier thereby producing a sinusoidal signal at the output of charge o amplifier with a gain (G) and a phase lag ($\phi$). Transfer function coefficients $C_0$ and $C_1$ are then calculated as follows:

$$C_1 = G(\sin \phi / wT)$$

$$C_0 = G(\cos \phi) - C_1$$

Figure 5:
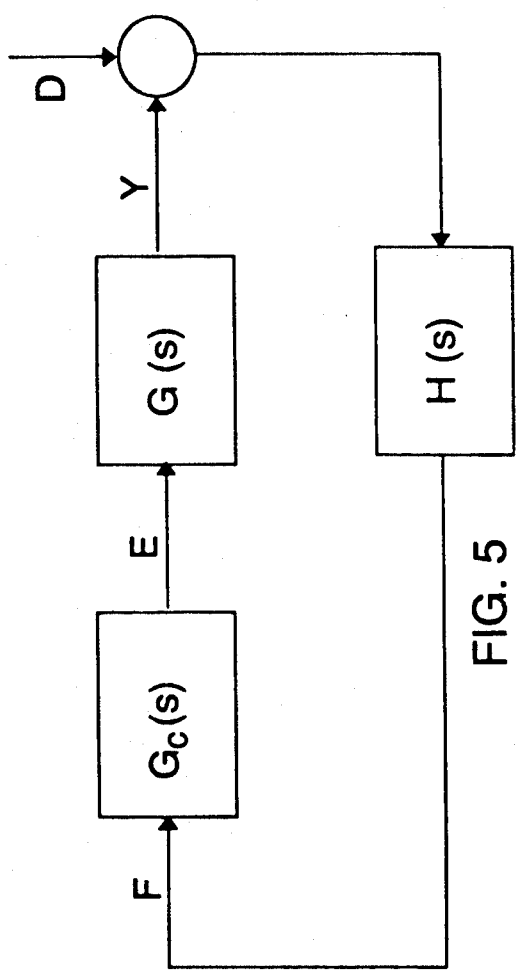
FIG. 5 is a block diagram of the apparatus of FIG. 1, particularly for wideband cancellation calculations.
Figure 6:
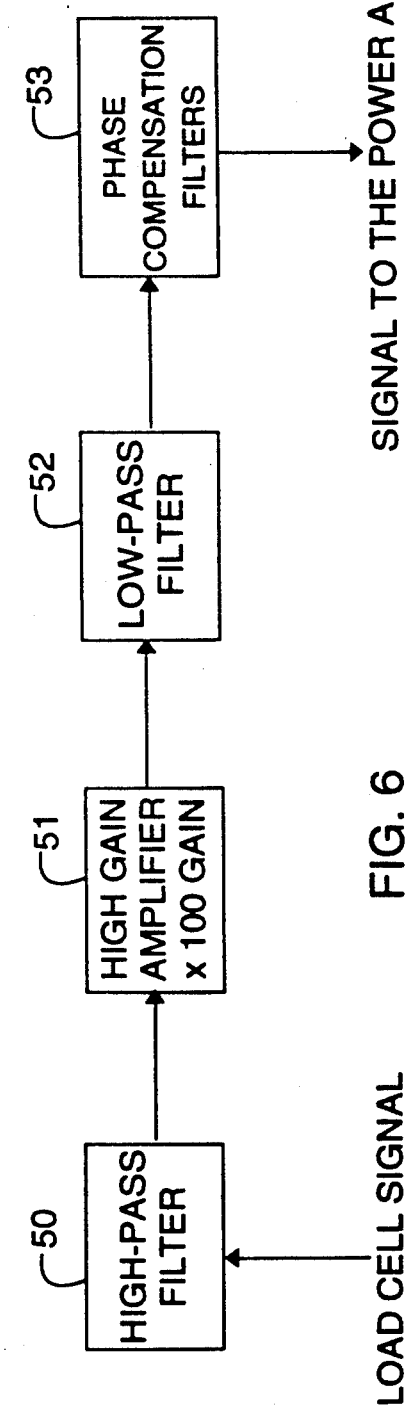
FIG. 6 is the block diagram for the high gain broadband control approach for attentuation of transmitted forces.

Similarly, FIG. 5 is useful in calculating the wideband cancellation characteristics of the active mount system 1. G(s) is the transfer function of the control amplifier input to the electromagnetic force Y (including the mechanical masses, rubber stiffness and damping, and the frequency response of the control amplifier and the electromagnet), H(s) is the transfer function of the charge amplifier, and $G_C(s)$ is the transfer function of the control circuitry, including the adaptive least mean square filter 36. In order to achieve a magnetic force Y to cancel the D signal (due to the motor shaking forces as measured by the load cell 10):

$$F = \frac{D/H(s)}{1 + H(s)G_c(s)G(s)}$$

It is further desirable for stability using the least mean square control approach that the absolute value of [1 + H(s)G (s)G(s)] is less than 10. Similarly, it is imperative there are no unstable roots to the characteristic equation. That is, this quantity (i.e., the denominator of the above equation) must not be equal to zero.

As an alternative to the least mean square control approach, a high-gain, broadband control can be employed with compensation circuitry to ensure that the close control loop system is unconditionally stable. Ideally, the phase of the transfer function $G_C(s)$ would be the inverse of the phase of G(s)H(s). However, the inverse approach leads to an extremely complicated circuitry. A practical approach to the high gain, broadband control is first to produce a $G_C(s)$ electronic circuitry with the high gain amplifier 51 to amplify the load cell signal. In the frequency range of where force attenuation is required, the amplifier gain is made as high as possible without causing system instability. The phase shift of the open loop control system is examined and the phase shift at frequencies where the open loop gain is unity are checked. The phase at these frequencies must be above $-180°$ for the natural modes of control system to be stable. Compensation circuits are included in the high gain, broadband controller to modify phase shifts at the unity gain frequency points so that the system loop will be unconditionally stable when the control loop is closed with the high gain amplifier in the loop.

The basic compensation circuits are a high-pass filter 50 at about 10 Hz to deal with the DC drift, a low-pass filter 52 at the high end of the frequency range, and phase compensation filters 53 wherever an unstable mode occurs in the frequency range of interest.

The present invention operates as follows: when the machine 8 transmits a dynamic force through resilient mount 2 to the table 32, the magnitude of that force is sensed by the force gauge 10 which measures the transmitted vibrational force. The sensed load signal is processed by one of the control approaches, as described above, including amplification and input as an error signal into either the adaptive least mean square filter 36 or the high gain, broadband control. It is understood that the sensor can be any kind of vibration sensing means such as a displacement sensor or a velocity sensor and the appropriate control circuitry would be employed in conjunction with the preferred sensor.

Figure 2:
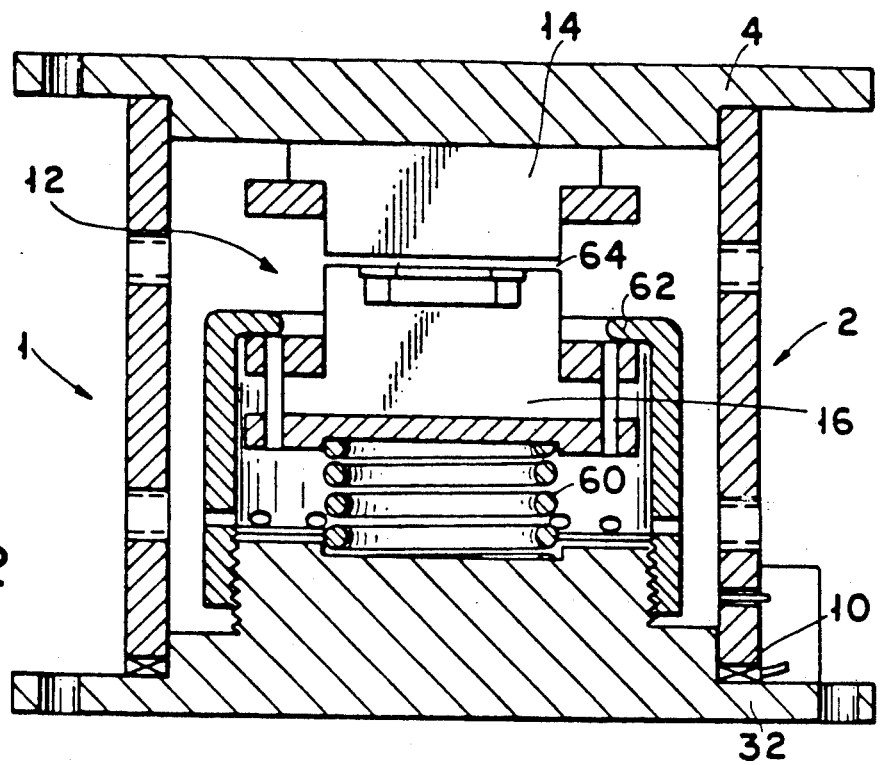
FIG. 2 is a partial schematic drawing of an active mount system in accordance with another embodiment of the present invention incorporating means to prevent damage to the system under high shock load conditions.

FIG. 2 illustrates another embodiment of the invention which includes means to prevent damage to the transducer means under high shock load conditions. The various components of the system shown in FIG. 2 which correspond to those of FIG. 1 are represented by the same reference numerals. Also, since the control circuitry arrangement is the same as in FIG. 1, such control circuitry is not illustrated in FIG. 2.

As shown in FIG. 2, the active mount system comprises a resilient mount 2, a sensor device 10, an electromagnet 12 including an armature 14 and a stator 16. The electromagnet 12 provides the force transducer means for the active mount system as described in connection with FIG. 1.

The system shown in FIG. 2 also includes a spring means 60 disposed between the stator 16 and the table 32 to provide a means for preventing damage to the electromagnet 12 under high shock load conditions.

In normal operation the stator 16 is preloaded by the spring 60 and held against the casing 62. During abnormal or a shock load situation when the armature 14 moves more than the distance of air gap 64, the spring 60 rapidly deflects to allow stator to retreat and thus avoid damage to the electromagnet 12.

Figure 3:
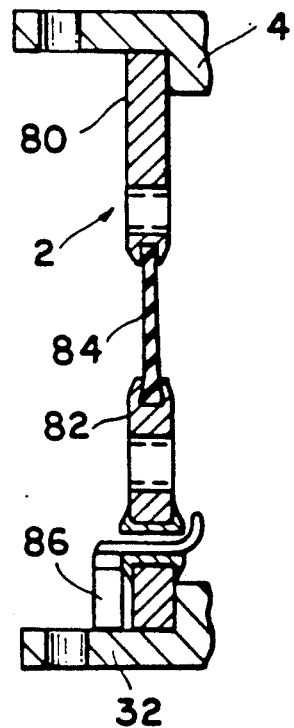
FIG. 3 is a sectional view of an arrangement providing for a relatively soft resilient mount.

FIG. 3 illustrates another embodiment of the invention wherein the resilient mount 2 is made relatively soft. As shown, the soft resilient mount 2 comprises an upper rigid section 80, a lower rigid section 82, and an intermediate section 84 made of a relatively soft elastomeric material. The upper rigid section 80 is disposed adjacent the machine mounting plate 4 and the lower rigid section 82 is disposed adjacent the table 32, with the intermediate soft elastomeric section 84 arranged between sections 80 and 82 to complete the resilient mount between the machine mounting plate 4 and the foundation or other supporting structure.

The system also includes a sensor device which measures the forces transmitted through the resilient mount 2. Since the resilient mount is relatively soft, it is preferred that the sensor device be an accelerometer mounted to either the machine mounting plate 4 or to the table 32. As shown in FIG. 3 the accelerometer 86 is mounted to the table 32. The output of the accelerometer is applied to the control circuitry as previously described in connection with FIG. I.

Obviously, numerous modifications may be made to the invention without departing from its scope as defined in the appended claims.

What is claimed is:

1. An active mount system comprising:
   a resilient mount for supporting a load in compression from a rotary machine supporting base to a supporting structure;
   sensing means for sensing a level of vibrational force transmitted from said load through said resilient mount;
   a means for generating a sinusoidal reference signal in synchronization with the rotary machine;
   control signalling means for transmitting a signal in response to the level of vibrational force sensed by said sensing means; and
   force transducing means for providing a force to attenuate said vibrational force transmitted through said resilient mount in response to said signal from said control signalling means;
   wherein said force transducing means includes an electromagnetic device in parallel with said resilient mount;
   wherein said control signalling means includes a least mean square adaptive filter receiving a reference input from said reference signal generating means and receiving an error signal from said sensing means and generates a corrective signal to said force transducing means.

2. An active mount system according to claim 1 wherein said force transducing means is an electromagnetic device in parallel with said resilient mount.

3. An active mount according to claim 1 wherein said resilient mount is formed of an elastomeric material.

4. An active mount system of claim 3 wherein said elastomeric material is rubber.

5. An active mount system according to claim 1 wherein said force transducer means is a piezoelectric device.

6. An active mount system according to claim 1 wherein said force transducer means is a magnetorestrictive device.

7. An active mount system according to claim 1 wherein said sensing means is a force gauge 8. An active mount system according to claim 1 wherein said digital sensing means is an accelerometer.

9. An active mount system according to claim 1 wherein said means for generating a sinusoidal reference signal comprises a speed sensor attached to said rotary machinery, said speed sensor generating a preselected number of pulses per rotation of said rotary machinery; and a sine wave generator which generates a sine wave synchronous with said rotary machine in response to said pulses.

10. An active mount system according to claim 1 including spring means disposed adjacent said force transducing means and arranged and constructed to allow for movement of said force transducing means when said mount is subject to high shock load.

11. An active mount system according to claim 1 wherein said force transducing means is an electromagnetic device having an armature and a stator and further including a spring means disposed adjacent said stator to allow for movement of said stator when said mount is subjected to a high shock load.

12. An active mount system comprising:
   a resilient mount for supporting a load in compression from a rotary machine supporting base to a supporting structure;
   sensing means for sensing a level of vibrational force transmitted from said load through said resilient mount;
   control signalling means for transmitting a signal in response to the level of vibrational force sensed by said sensing means; and
   force transducing means for providing a force to attenuate said vibrational force transmitted through said resilient mount in response to said signal from said control signalling means;
   wherein said force transducing means includes an electromagnetic device in parallel with said resilient mount;
   force transducing means for providing a force to attenuate said vibrational force transmitted through said resilient mount in response to said signal from said control signalling means;

* * * * *